No. 717,453.  
E. T. ROBINSON.  
PLOW.  
(Application filed Apr. 26, 1902.)  
Patented Dec. 30, 1902.
(No Model.)
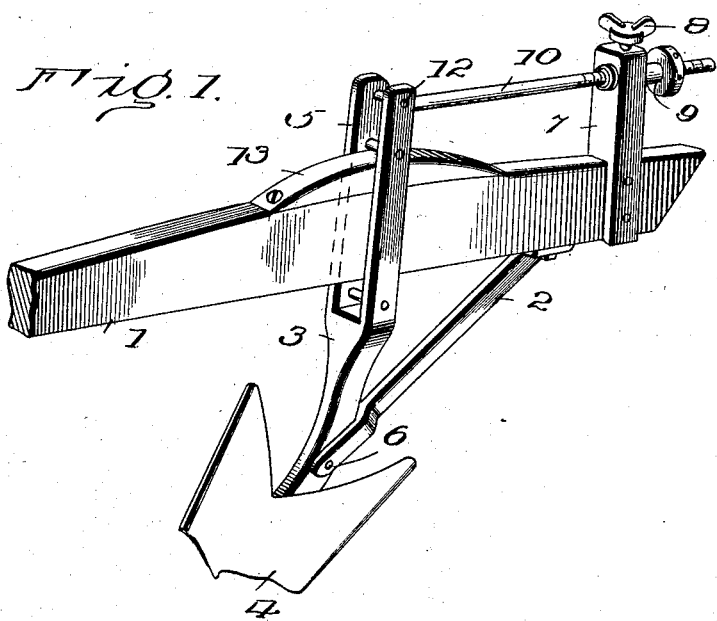
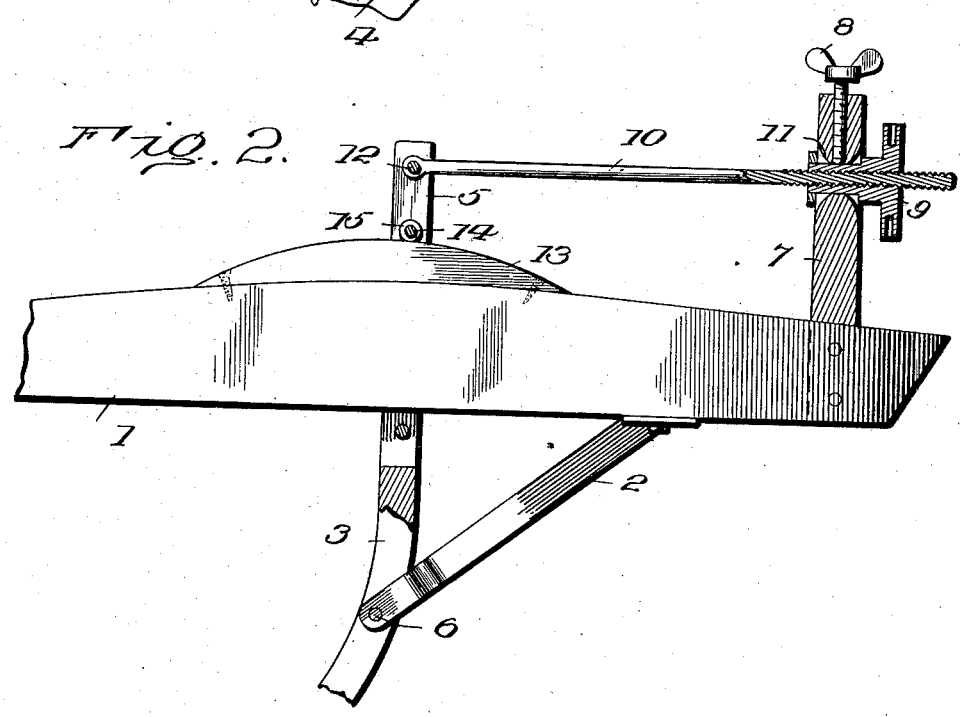
Witnesses  
Inventor  
E. T. Robinson  
Attorneys

UNITED STATES PATENT OFFICE.

ELI TERRY ROBINSON, OF MARION, ALABAMA.

PLOW.

SPECIFICATION forming part of Letters Patent No. 717,453, dated December 30, 1902.

Application filed April 26, 1902. Serial No. 104,824. (No model.)

*To all whom it may concern:*

Be it known that I, ELI TERRY ROBINSON, a citizen of the United States, residing at Marion, in the county of Perry and State of Alabama, have invented certain new and useful Improvements in Plows; and I do hereby declare the following to be a full, clear, and exact description of the invention, such as will enable others skilled in the art to which it appertains to make and use the same.

This invention has relation to plows and like agricultural implements, the purpose being the provision of novel means for regulating the depth of opening the ground either for plowing or cultivation by varying the inclination of the stock to which the shovel is attached.

In accordance with this invention the stock is pivotally mounted and comprises portions which embrace the sides of the plow-beam, a set-screw for adjusting the plow-stock, a nut coöperatively related to the set-screw for effecting an adjustment of the stock, and means for securing the nut to hold the parts in an adjusted position.

For a full description of the invention and the merits thereof, and also to acquire a knowledge of the details of construction of the means for effecting the result, reference is to be had to the following description and drawings hereto attached.

While the essential and characteristic features of the invention are susceptible of modification, still the preferred embodiment of the invention is illustrated in the accompanying drawings, in which—

Figure 1 is a perspective view showing the manner of applying the invention to a plow or cultivator. Fig. 2 is a side elevation of the parts shown in Fig. 1, parts being broken away to show more clearly the structural details.

Corresponding and like parts are referred to in the following description and indicated in both views of the drawings by the same reference characters.

The beam 1 may be of any make or construction commonly employed in plows, cultivators, and like implements. A brace 2 is secured to the beam 1 and inclines forwardly and downwardly and pivotally supports the stock 3, to which the shovel 4 is attached.

The stock 3 is provided at its upper end with spaced portions 5, which embrace opposite sides of the beam 1 and serve to prevent lateral movement of the stock when the implement is in operation. In the preferable construction the stock 3 is forked and the spaced portions 5 constitute the fork sides or members. When the upper end of the stock 3 is moved rearward, the shovel 4 is elevated and caused to penetrate the earth to a less depth, and when the upper end of the stock is thrown forward the shovel 4 is lowered and caused to enter the earth to a greater depth. It will thus be understood that the depth of penetration of the shovel is regulated by adjusting the stock upon its pivotal connection 6 with the brace 2.

A standard 7 is secured to the beam 1 in the rear of the stock 3 and projects vertically from the said beam and is provided at its upper end with a clamp-screw 8. A set-nut 9 is mounted in the upper portion of the standard 7 for free rotation and receives the threaded portion of a rod 10, attached at its forward end to the upper portion of the stock 3. The opening 11 in the upper portion of the standard 7, in which the nut 9 is mounted, has its end portions flared to admit of a vertical play of the nut to prevent binding, this being necessary because of the variation of the threaded rod 10 from the horizontal in the adjustment of the plow-stock 3 when raising or lowering the shovel 4. The butt-end of the threaded rod 10 is provided with an eye, through which passes the pin or bolt 12, supported at its ends in the fork members 5.

To prevent vertical displacement of the stock 3, a curved seat 13 is provided upon the top side of the beam 1 and is concentric with the pivot-support 6 of the stock 3. The curved seat 13 may be provided in any convenient way and is preferably a block secured to the top side of the beam 1 and having its upper face formed on the arc of a circle having the pivot-fastening 6 for a center. A pin or bolt 14 is supported at its ends in the fork sides 5 and is provided with a roller 15, which is arranged to travel upon the seat 13. The part 13 has its sides flush with the sides of the beam 1, thereby widening the said beam and increasing the extent of surface in engagement with the fork members 5, whereby the stock 3 is more firmly braced against lateral stress.

When it is required to cause the shovel to run to a less depth, the set-nut 9 is turned to effect a backward movement of the upper end of the stock 3, with the result that the shovel 4 is lifted. If it be required to cause the shovel to plow deeper, the set-nut 9 is turned to throw the upper end of the stock 3 forward, resulting in lowering the shovel 4. After the shovel 4 has been adjusted to the required position it is made fast by turning the clamp-screw 8, which binds against the set-nut 9 and prevents rotation thereof in either direction.

Having thus described the invention, what is claimed as new is—

1. In an agricultural implement, and in combination with a beam, a stock, and means for pivotally connecting the lower portion of the stock with the beam, a threaded rod having connection with the upper end of the stock, a set-nut mounted upon the said threaded rod, and a support for the said set-nut, the parts being arranged to effect an adjustment of the stock to raise and lower the shovel, substantially as set forth.

2. In combination with a beam, a pivotally-supported stock, and a threaded rod, a set-nut mounted upon the threaded rod, a support for the set-nut, and a clamp-screw for securing the set-nut to hold the stock in an adjusted position, substantially as set forth.

3. In combination, a beam, a stock having its upper portion extended above the beam and pivotally connected with said beam at a point below the same, a curved seat concentric with the pivotal support of the stock, a lateral projection adapted to travel upon the said curved seat for supporting the stock at any position within the range of its adjustment, and adjusting means for turning the stock upon its pivotal support to effect a raising or a lowering of the shovel, substantially as set forth.

4. In combination, a beam, a brace secured at its upper end to the beam, a stock pivotally connected with the lower end of the said brace and having its upper end portion constructed to embrace opposite sides of the beam, a curved seat concentric with the pivotal support of the stock, a pin carried by the upper end portion of the stock and adapted to coöperate with the curved seat to support the stock at any position in the range of its adjustment, a threaded rod having connection with the upper end of the stock, a set-nut coöperating with the threaded rod, and a clamp-screw for securing the parts in an adjusted position, substantially as specified.

In testimony whereof I affix my signature in presence of two witnesses.

ELI TERRY ROBINSON. [L. S.]

Witnesses:
W. T. HENDON,
R. B. SCANELL.